United States Patent [19]

Taddeo

[11] Patent Number: 4,768,386
[45] Date of Patent: Sep. 6, 1988

[54] AIR PRESSURE MEASUREMENT ELEMENT AND SYSTEM INCORPORATING SAME

[75] Inventor: John Taddeo, Liverpool, N.Y.

[73] Assignee: Cambridge Filter Corp., Syracuse, N.Y.

[21] Appl. No.: 896,449

[22] Filed: Aug. 14, 1986

[51] Int. Cl.$^4$ .................. G01F 1/46; G01P 5/165
[52] U.S. Cl. ..................... 73/861.66; 73/147
[58] Field of Search ........... 73/861.66, 861.65, 861.42, 73/147, 182, 189

[56] References Cited

U.S. PATENT DOCUMENTS

| 2,179,500 | 11/1939 | Diehl | 73/861.65 |
|---|---|---|---|
| 2,590,521 | 3/1952 | Dyche, Jr. | 73/861.65 |
| 3,673,866 | 7/1972 | Alperovich et al. | 73/861.65 |
| 3,751,982 | 8/1973 | Lambert | 73/861.66 |
| 3,791,207 | 2/1974 | Jackson, Jr. et al. | 73/147 |
| 4,444,060 | 4/1984 | Yamamoto | 73/861.66 |
| 4,559,835 | 12/1985 | DeBaun | 73/861.66 |
| 4,602,514 | 7/1986 | Kurrle et al. | 73/861.66 |

FOREIGN PATENT DOCUMENTS

| 1080143 | 8/1967 | United Kingdom | 73/861.65 |
|---|---|---|---|
| 2,032,118A | 1/1980 | United Kingdom | 73/861.66 |

Primary Examiner—Joseph A. Orsino, Jr.
Assistant Examiner—Brent A. Swarthout
Attorney, Agent, or Firm—Charles S. McGuire

[57] ABSTRACT

A unitary element for use in measuring the total and static pressure of a gas flowing through a duct is disclosed in a preferred embodiment. The element is elongated and hollow, having a continuous, impermeable wall dividing the interior into total and static pressure chambers. In cross section, the element is of aerodynamic or airfoil shape, having a curved forward edge and converging toward the trailing edge adjacent which the outer surfaces are parallel for a short distance. Spaced openings along the forward edge and the upper and lower portions of the rearwardly converging wall portions communicate with the total and static pressure chambers, respectively. Separate manifolds communicate with the total and static pressure chambers of a plurality of such members arranged across an air flow duct to obtain average pressure readings across the cross section of the duct. Configuration of the measuring element and the position of the static pressure openings highly influence accuracy of the signals and permit velocity pressure readings which are amplified, yet linear over a wide range, with respect to actual velocity pressure within the duct.

18 Claims, 3 Drawing Sheets

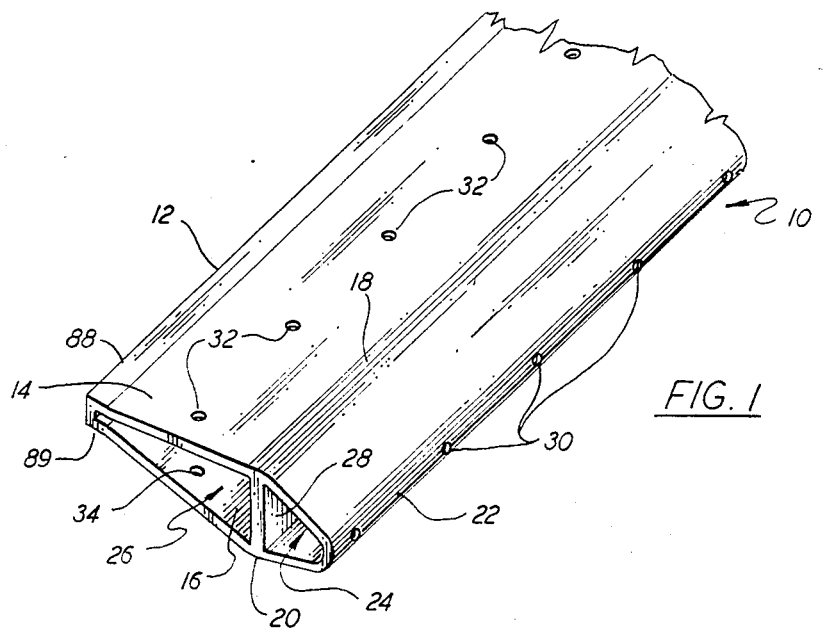
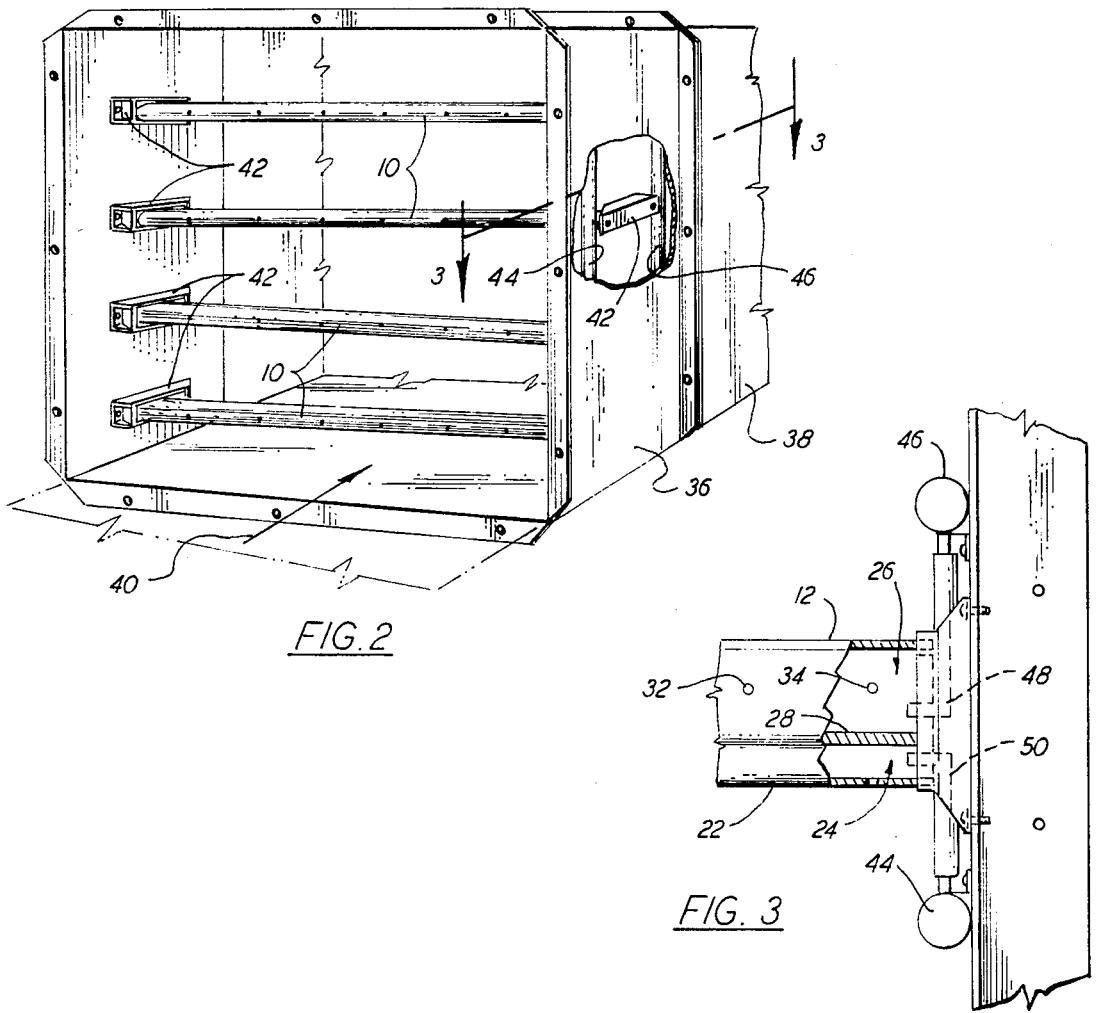

AIR PRESSURE MEASUREMENT ELEMENT AND SYSTEM INCORPORATING SAME

BACKGROUND OF THE INVENTION

The present invention relates to systems for measuring total and static pressure in a gas flowing through an enclosed duct and to a uniquely configured, unitary element useful in making such measurements.

Systems which regulate the flow of air through closed duct or conduits, as in central heating, ventilating and air conditioning systems, are commonly controlled in response to the velocity of flow as indicated by total and static pressure measurements taken at various stations throughout the ductwork. That is, since velocity of air flow is a function of the velocity pressure, which is equal to total pressure minus static pressure, the velocity may be determined and thus controlled in accordance with readings of total and static pressure. In the most common systems, both total pressure and static pressure are sensed at a plurality of points throughout the cross section of the duct at each measuring station. In order to provide acceptable levels of accuracy, some systems provide flow straightening means to reduce turbulence of the air stream in advance, i.e., on the upstream side of the pressure sensors. The total and static pressures sensed at the individual points are separately averaged in respective, common manifolds.

It is a principal object of the present invention to provide a novel and improved system for measuring total and static pressure of air flowing through an enclosed duct.

Another object is to provide an element of unique design for use in measuring total and static pressure of air flowing within a duct to achieve significant advantages over prior art elements of this type.

A further object is to provide a system for measuring total and static pressure of an air stream flowing through an enclosed duct wherein the static pressure readings are proportionately lower than the actual static pressure in the duct, thereby providing velocity pressure signals which are amplified with respect to actual velocity pressure of the air stream, but remain linearly related thereto.

Additional objects are to provide an air flow measuring element, and system incorporating such elements, for positioning in ductwork and having a tolerance of turbulent air flow, and a configuration providing both economy of fabrication and adaptability to use in a variety of applications.

Other objects will in part be obvious and will in part appear hereinafter.

SUMMARY OF THE INVENTION

The foregoing objects and advantages are achieved through a design which includes an elongated, tubular member formed from a single, continuous, outer wall having a cross section of airfoil shape with a rounded, forward end, diverging to a point of maximum thickness and thence converging rearwardly to be joined to itself at a trailing end. The hollow member is divided internally by an impervious partition into forward and rear chambers extending the full length of the member.

In use, the tubular member, or a plurality of such members, is supported at its ends on opposite walls of an enclosed duct to extend transversely across the duct, perpendicular to the direction of air flow therethrough. The rounded, forward end of the tubular member faces in the upstream direction, whereby air flowing through the duct impinges directly on the rounded or curved outer surface and flows over and under the upper and lower surfaces of the member. Total pressure of the air flowing through the duct is sensed by means of openings which extend through the outer wall of the tubular member, at spaced points along the length thereof, at the forwardmost point on the curved, forward end, whereby total pressure of the air flowing through the duct is communicated to the forward chamber in the tubular member. Static pressure is sensed by means of similar orifices extending through the wall of the tubular member in both the upper and lower surfaces to communicate with the rear chamber.

Depending upon the size (cross sectional area) of the duct, and its configuration (.e.g, square, round, or oval), a plurality of the above-described tubular members may be arranged transversely to the direction of air flow at each position or station in the duct where pressure measurements are to be made. Furthermore, it is insured that a sensing orifice is provided at each desired increment of cross sectional area of the duct. The tubular members are closed at the ends and the forward and rear chambers of each member communicate through one end with separate, total and static pressure manifolds, respectively. In this manner, the total and static pressure sensed at the various points about the cross section of the duct are averaged in the respective manifolds, and conventional pressure measurement taps are provided to obtain readings of the total and static pressures from which the velocity of air flow through the duct may be determined.

A further important constructional detail of the tubular member is the configuration at the trailing end. As mentioned, the member is preferably formed from a single, continuous wall which has an outer surface of airfoil configuration, i.e., it is of essentially "tear-drop" shape as viewed from the sides. Portions of the outer wall surface near the trailing edge are parallel, rather than converging continuously to a pointed trailing end. This configuration influences the nature of air flow around the member, providing flow perpendicular to the static pressure sensing ports. Also, the position of the static ports with respect to the trailing edge of the hollow member influence the value of static pressure signal.

Constructional and operational details of the air flow measurement system of the invention will be more fully apparent from the accompanying drawings, and the following detailed description of the preferred embodiment.

BRIEF DESCRIPTION OF THE DRAWINGS

FIG. 1 is a fragmentary, perspective view, of the hollow, tubular member of the invention for sensing total and static pressure of air flow in a duct wherein the member is positioned;

FIG. 2 is a perspective view of a section of ductwork with the elements embodying the invention, including members such as that shown in FIG. 1, mounted therein;

FIG. 3 is an enlarged, fragmentary, elevational view of a portion of the apparatus of FIG. 2, in section on the line 3—3 thereof;

DETAILED DESCRIPTION

Figure 5:
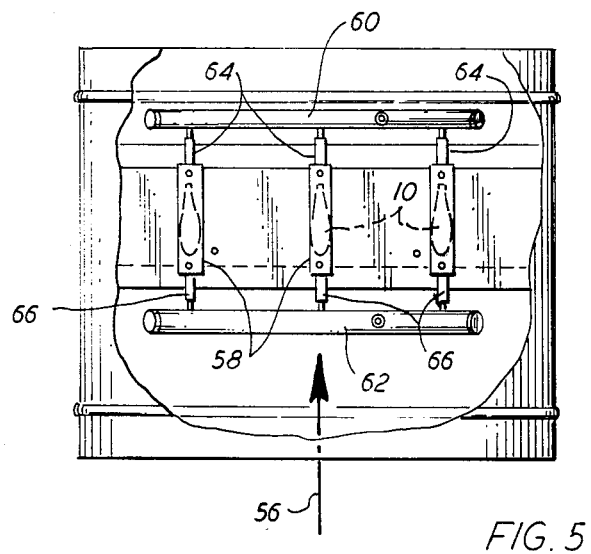
FIG. 5 is an end elevational view, taken from the upper end of the apparatus of FIG. 4, with portions broken away.

Referring now to the drawings, in FIG. 1 is shown an enlarged fragment of an air pressure measurement member, denoted generally by reference numeral 10, forming an important part of the invention. Member 10 may advantageously be formed as an aluminum extrusion having a single, continuous, outer wall, joined to itself at trailing edge 12, and having upper and lower portions 14 and 16, respectively, diverging from leading edge 22 to points of maximum transverse spacing (in a direction mutually perpendicular to the longitudinal and front-rear axes of member 10) at 18 and 20, then converging to a trailing edge 12. Thus, member 10 forms a hollow enclosure having an outer wall of airfoil configuration. The hollow interior of member 10 is divided into forward and rear chambers 24 and 26 by solid, continuous, interior wall 28, extending between upper and lower wall portions 14 and 16, preferably at substantially the points of maximum spacing thereof. A first series of openings 30 extend through the outer wall of member 10 along the foremost part of leading edge 22, communicating with forward compartment 24. Second and third series of spaced openings 32 and 34 extend through upper and lower portions 14 and 16, respectively of the outer wall of member 10 to communicate with rear compartment 26. The openings of each series are spaced by predetermined distances, as explained later.

In FIG. 2 a total of four members 10 are arranged in evenly spaced, parallel, horizontal relation within open, rectangular support wall 36 having cross sectional dimensions equal to that of a rectangular flow duct, a fragment of which is shown at 38, to provide an air flow measurement station at a selected position within the duct. Wall 36 is mounted in duct 38 by mating flanges. The direction of air flow through duct 38 is indicated by arrow 40, leading edges 22 of members 10 being directed for impingement of the air stream directly thereon. Members 10 are supported at each end by brackets 42. Both of the ends of members 10 are closed and manifolds 44 and 46, extending vertically along one side of support structure 38, communicate with the interiors of forward and rear compartments 24 and 26, respectively, through open conduits 48 and 50, as seen in FIG. 3.

Figure 4:
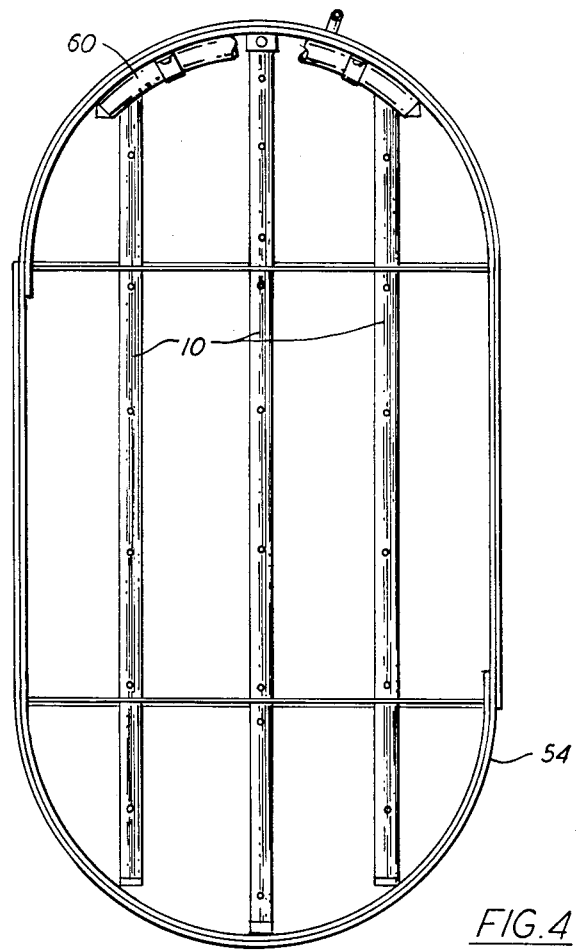
FIG. 4 is a front elevational view showing elements of the invention mounted in ductwork of a second cross sectional configuration.
Figure 6:
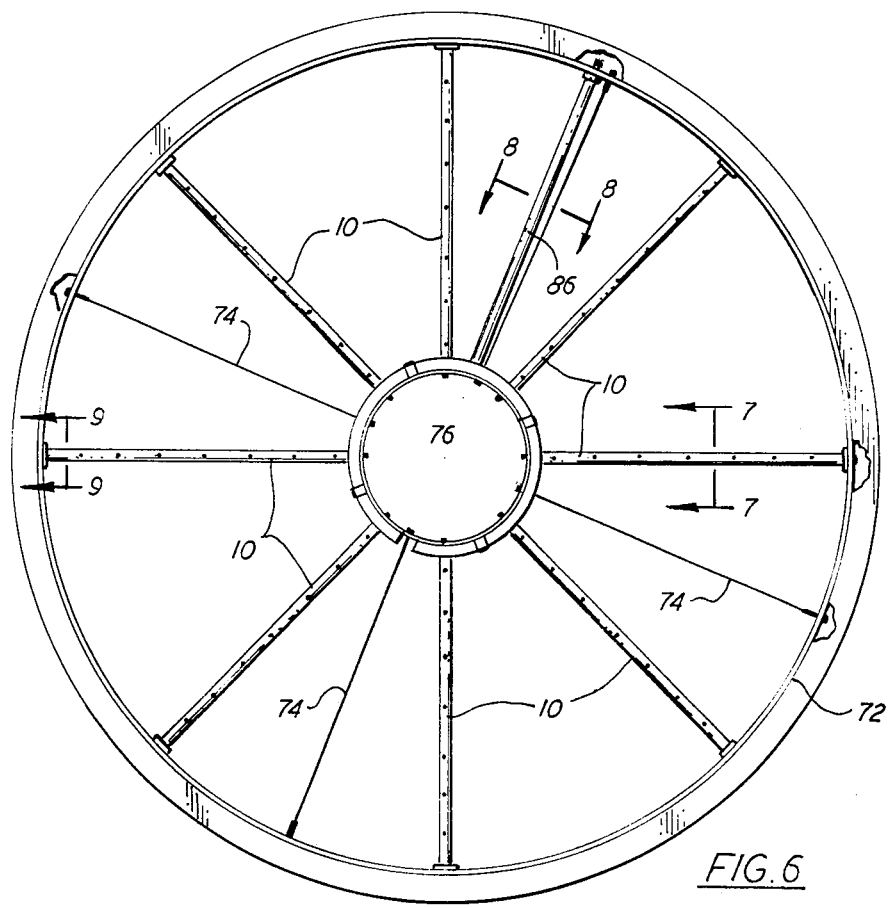
FIG. 6 is a front elevational view of apparatus of the invention mounted in ductwork of a third cross sectional configuration.
Figure 7:
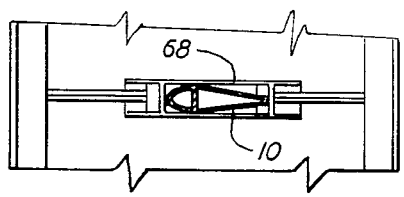
FIGS. 7-9 are fragmentary, side elevational views of portions of the apparatus of FIG. 6, taken on the lines 7—7, 8—8 and 9—9 thereof, respectively.
Figure 9:
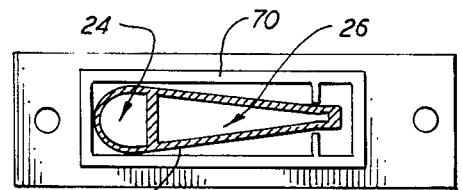

Turning now to FIGS. 4 and 5, a plurality of members 10 are shown supported in parallel relation within oval-shaped support wall 54, for positioning in an air flow duct of the same shape. The direction of air flow is into the plane of the drawing in FIG. 4, and is indicated by arrow 56 in FIG. 5. Brackets 58 support members 10 at each end, as in the previous configuration. Arcuate manifolds 60 and 62 extend partially about one end of support structure 54 on opposite sides of one end of each of members 10, and respectively communicate with the rear and forward chambers within members 10 through connecting conduits 64 and 66, also as previously described.

Figure 8:
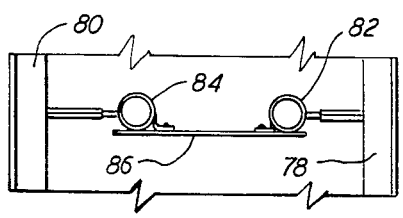

A third configuration in which the air flow measurement system of the invention is employed is shown in FIGS. 6-9. Members 10 extend radially between inner and outer ends, supported by brackets 68 and 70, respectively. Support wall 72 is circular, for placement in an air flow duct of like configuration. Tensioned support rods 74 extend inwardly from circular wall 72 to inner ends connected to concentric, cylindrical support member 76 which provides a support both for the inner ends of members 10 and for circular manifolds 78 and 80 (FIG. 8). Manifolds 78 and 80 communicate with forward and rear chambers 24 and 26, respectively, of each of members 10. Also, conduits 82 and 84, each attached to support plate 86, extend from communication with manifolds 78 and 80, respectively, to pressure take-off ports at their inner ends.

In operation, the air flowing through the duct in which members 10 are positioned impinges directly upon leading edge 22 and, through openings 30, causes the air pressure within forward chamber 24 to duplicate the total pressure of the air in the duct. The air flows over the airfoil surface of members 10, essentially parallel to upper and lower portions 14 and 16, and thus to openings 32 and 34, whereby the pressure within rear chamber 26 reflects static pressure within the duct.

It is important to note that the configuration of the outer wall of member 10 includes parallel portions 88 and 89 extending for a short distance forwardly of trailing edge 12 across the length of member 10. That is, the outer surfaces of upper and lower wall portions 14 and 16 do not converge rearwardly for the entire distance from points 18 and 20 to trailing edge 12. This has a significant effect on the pattern of air flow over upper and lower wall portions 14 and 16, causing it to be more parallel to the surfaces thereof, and therefore more perpendicular to openings 32 and 34, whereby the pressure within chamber 26 more accurately reflects a static pressure proportional to the static pressure in the duct.

The number and spacing of both members 10 within the duct and the sensing ports along members 10 (openings 30 communicating with forward chamber 24, and openings 32 and 34 communicating with rear chamber 26) are selected to provide total and static pressure sensing ports within increments of the cross-sectional area of the duct of a desired, predetermined size. Since the total and static pressure manifolds communicate with the respective total and static pressure chambers of all of members 10, the pressures within each manifold accurately reflect the total and static pressure at any given time within the duct. Conventional pressure measurement apparatus (not shown) is connected to the total and static pressure manifolds for obtaining readings of the pressure therein.

It should be noted that, while accurate pressure readings may be obtained with an air flow measuring member such as that described, having a substantially airfoil-shaped cross section and divided by an internal wall into forward and rear chambers, such readings will be affected by changes in the configuration and dimensional relationships of the member. For example, the parallel surface portions 88 and 89 adjacent the trailing edge of the member influence the pattern of air flow in such a way as to provide a marked improvement in the accuracy of static pressure measurements. The parallel surface areas preferably extend forwardly of the trailing edge for a distance on the order of 5% of the total width of the element, from leading to trailing edge, in elements having a maximum thickness on the order of 30% of total width. Members 10 have been constructed in an actual, preferred embodiment 1.865" in total width (linear distance from leading edge 22 to trailing edge 12) and 0.520" in maximum thickness (between points 18 and 20) with parallel surfaces extending 0.100" forwardly of trailing edge 12. In that construction, the thickness at trailing edge 12, i.e., the distance between parallel surfaces 88 and 89, was 0.158".

The positioning of static pressure sensing ports 32 and 34 with respect to trailing edge 12 also has been found to influence the resulting pressure signal in a manner which may be employed to advantage. For example, in the member having the dimensions described in the preceding paragraph, positioning static sensor ports 32 and 34 along parallel lines 0.190" forwardly of trailing edge 12 provided a static pressure reading within chamber 26 essentially equal to the actual static pressure within the duct. However, by positioning ports 32 and 34 along parallel lines 0.987" forwardly of trailing edge 12 (i.e., at a location on the order of one-half the total width of member 10) the static pressure signal is decreased from but remains in linear relation to the duct static pressure over a relatively wide range. This provides an increase in the apparent velocity pressure on the order of 30% without a sacrifice in accuracy, which can be very useful in the control of air flow systems such as those with which the present invention is concerned.

The size of openings 30, 32 and 34 is not critical, nor are the volumes of total and static pressure chambers 24 and 26. In the aforementioned embodiment, total pressure ports 30 were 1/16th" in diameter, while static ports 32 and 34 were 1/32". The static pressure ports should be small enough to ensure that there is essentially no air flow through the ports and into the static pressure chamber. It is also significant to note that the disclosed system is tolerant of turbulent air flow in the duct, requiring no honeycomb-type or other flow straightening means in order to obtain an accurate signal, as in many similar prior art systems.

What is claimed is:

1. A pressure sensing member for mounting in a predetermined orientation in an air stream to measure total and static pressure, said member comprising:
   (a) an elongated body portion having a substantially uniform cross section throughout its length;
   (b) said cross section being of airfoil configuration with a curved, leading edge, upper and lower surfaces diverging rearwardly from said leading edge to a point of maximum spacing, thence converging toward a trailing edge, and a hollow interior;
   (c) an impervious wall extending across said hollow interior and dividing the latter into a forward chamber, adjacent said leading edge, and a rear chamber, adjacent said trailing edge;
   (d) a first plurality of openings extending through said body portion in spaced relation along said leading edge and communicating with said forward chamber; and
   (e) a second plurality of openings extending through said body portion rearwardly of said point of maximum spacing and communicating with said rear chamber.

2. The invention according to claim 1 wherein said impervious wall extends across said hollow interior substantially between said points of maximum spacing.

3. The invention according to claim 2 wherein said member is formed as a unitary, aluminum extrusion.

4. The invention according to claim 1 wherein said second plurality of openings includes first and second series of openings respectively extending through said upper and lower surfaces in the converging portions thereof.

5. The invention according to claim 4 wherein said first and second series of openings are each arranged in spaced relation along parallel lines on said upper and lower surfaces, respectively, which are equidistant from said trailing edge.

6. The invention according to claim 1 wherein said upper and lower surfaces are parallel to one another for a distance forwardly of and adjoining said trailing edge on the order of 5% of the linear distance between said leading and trailing edges.

7. The invention according to claim 6 wherein said second plurality of openings includes first and second series of openings respectively extending through said upper and lower surfaces and arranged along parallel lines which are equidistant from said trailing edge.

8. The invention according to claim 7 wherein said parallel lines are positioned forwardly of said trailing edge a sufficient distance to provide a static pressure signal within said rear chamber which is decreased with respect to the static pressure of the air stream surrounding said member, thereby providing an amplified velocity pressure value.

9. The invention according to claim 8 wherein said impervious wall extends across said hollow interior forwardly of the front-to rear center thereof.

10. The invention according to claim 9 wherein said parallel lines are between about 40% and 60% of the linear distance from said trailing edge to said leading edge.

11. A system for determining the velocity of a stream of air flowing through an enclosed duct of predetermined cross sectional size and shape by measuring the total and static pressure of the air stream, said system comprising:
   (a) at least one hollow, elongated member extending transversely across said duct, said member having a cross section of airfoil configuration with a curved, leading edge and extending rearwardly therefrom to form upper and lower surfaces diverging to a point of maximum spacing in a direction transverse to the longitudinal and front-rear axes of said member, and thence converging inwardly toward a trailing edge, said member being arranged with said leading edge facing oppositely to the direction of airflow through said duct;
   (b) an impervious wall extending across the hollow interior of said member in a plane transverse to the front-rear axis of said member for the full length of said member to divide said hollow interior into forward and rear chambers;
   (c) a first plurality of openings extending through said member in spaced relation along said leading edge, whereby said duct communicates with said forward chamber and the total pressure of said stream of air is communicated directly to said forward chamber through said first openings;
   (d) a second plurality of openings extending through said member in spaced relation along both the upper and lower inwardly converging portions thereof, whereby said duct communicates with said rear chamber and a static pressure commensurate with the static pressure of said air stream is communicated to said rear chamber through said second openings; and (e) means for communicating the pressures within said forward and rear chambers to pressure measurement means.

12. The invention according to claim 11 wherein said communicating means comprise a pair of manifold members respectively communicating with said forward and rear chambers through adjacent taps at one end of said member.

13. The invention according to claim 12 wherein a plurality of said members extend transversely across the duct with said leading edge of each of said members in a single plane normal to the axis of the duct and said manifold members respectively communicate with said forward and rear chambers of a plurality of said members.

14. The invention according to claim 11 wherein said upper and lower surfaces are parallel to one another for a distance forwardly of and adjoining said trailing edge on the order of 5% of the linear distance between said leading and trailing edges.

15. The invention according to claim 14 wherein said first and second pluralities of openings are spaced from one another to provide an opening of each of said pluralities in equal size increments of the cross sectional area of the duct.

16. The invention according to claim 15 wherein the duct is rectangular in cross section and a plurality of said members extend transversely across the duct in parallel relation.

17. The invention according to claim 15 wherein the duct is oval in cross section and a plurality of said members extend transversely across the duct in parallel relation.

18. The invention according to claim 15 wherein the duct is circular in cross section and a plurality of said members extend transversely across the duct in radial relation thereto.

* * * * *